United States Patent [19]

Hunter

[11] Patent Number: 4,603,068

[45] Date of Patent: Jul. 29, 1986

[54] DISPLAY PANEL AND A DISPLAY PANEL SYSTEM

[75] Inventor: David Hunter, Wakefield, England

[73] Assignee: Harte Woodworking Limited, Ossett, England

[21] Appl. No.: 656,984

[22] Filed: Oct. 2, 1984

[30] Foreign Application Priority Data

Jun. 8, 1984 [GB] United Kingdom ................. 8414645
Jun. 30, 1984 [GB] United Kingdom ................. 8416701

[51] Int. Cl.[4] ................................................ B32B 3/18
[52] U.S. Cl. ...................................... 428/54; 428/174; 52/539; 52/588
[58] Field of Search .................... 428/174, 53, 54, 192; 52/588, 580, 537, 538, 545, 546, 519, 539

[56] References Cited

U.S. PATENT DOCUMENTS 877,639 1/1908 Galbraith .............................. 52/537
3,759,007 9/1973 Thiele .............................. 52/588 X

*Primary Examiner*—Alexander S. Thomas
*Attorney, Agent, or Firm*—Murray and Whisenhunt

[57] ABSTRACT

A display panel constructed from a plurality of similar panel members 10 having a cross-section shaped to provide an undercut recess 14, 16 extending throughout its length along at least one of its longitudinal edges. Each panel member has a formation 22, 26 along one longitudinal edge and a correspondingly shaped formation 22, 26, along another longitudinal edge, so that the panel member can form a tongue and groove joint with a similar panel member. The relationship between the undercut recess and the adjacent formation is such that when a joint with another panel member is effected the undercut recess remains open. Thus the panel members can be used to construct a slatted panel display system.

11 Claims, 6 Drawing Figures

DISPLAY PANEL AND A DISPLAY PANEL SYSTEM

BACKGROUND TO THE INVENTION

This invention relates to a panel for use in the construction of a display system, for example in a shop, or exhibition, and the invention also comprehends a display system which incorporates the panel and a display construction method which utilises the panel.

DESCRIPTION OF THE PRIOR ART

More particularly, the invention relates to so-called "slatted panel" display systems, that is to say, systems wherein a series of juxtapposed panels is used to clad a wall or display unit, or to constitute a display unit, there being longitudinally extending undercut grooves in the panelling for the attachment of goods which are to be displayed. Slatted panel displays are used in stores to an increasing extent, but are relatively expensive to manufacture and relatively cumbersome to transport and fit.

One known type of slatted panel is disclosed in U.S. Pat. No. 4,450,655, which describes a relatively complicated construction involving the sandwiching of particle board between plywood.

OBJECT OF THE INVENTION

It is the object of the invention to provide a slatted panel which can be produced more economically than known panels and which is easy to transport and fit.

SUMMARY OF THE INVENTION

According to this invention a display panel comprises a panel member having a cross-section such that there is an undercut recess or groove extending throughout its length along at least one of its longitudinal edges, the panel also having either a tongue or a groove suitable for a tongue-and-groove joint along each of its longitudinal edges, and the relationship between the or each undercut recess and its adjacent tongue or groove being such that when a tongue-and-groove joint is effected with a similar panel member, the undercut recess will remain open along its entire length.

Preferably the panel member has a tongue along one longitudinal edge and a matching groove along the other longitudinal edge, so that the tongue of one panel member can be fitted into the groove of an adjacent identical panel member, whereby cladding of a display unit or system can be constructed entirely from a set of two or more panel members, each constructed in accordance with this preferred form of the invention. It is further preferred that the tongue and groove are so dimensioned that the tongue is a sliding fit within the groove of an adjacent panel member.

The invention makes it possible to prefabricate a panel using economic methods of construction such as extruding, moulding. The individual panel members are easy to transport and handle and can be assembled on site to make up a panel of any desired size.

The joint between adjacent panel members can be concealed beneath one of the undercut portions of the recess.

The panel may be extruded in aluminium or aluminium alloy. Aluminium is inherently sufficiently fire-resistant and requires no fire-proofing treatment; it is of a low enough density to enable rigid panel members to be extruded which are readily manipulable; it is relatively easy to extrude and equally it is easy to machine.

One of the advantages of the invention is that the panel members can be stored in standard lengths and simply cut to a required length, and otherwise machined to fit on supporting structures, as and when required.

In a preferred construction, suitable for the creation of a slatted panel display, a panel member comprises a generally planar fronting central portion with a returned portion at each end forming a channel along the longitudinal edge of the centre portion, the tongue or groove, as the case may be, being formed on or in a rear part of the channel which is generally parallel with the centre portion. Preferably the two rear portions are so arranged relatively to the centre portion that when two such panel members are jointed together, there is a longitudinally extending gap between the two centre portions and the two channels open from the rear side of this gap to provide a composite undercut groove in the panel system.

Instead of using aluminium, plastics, timber or timber substitute may be used, for example hardwood, softwood, reconstituted timber and the like. The panel members may be formed by moulding, machining using known cutters, which form the material to a required cross-sectional shape, or by the forming of powdered material such as wood pulp, or plastics, by pressing it in a mould.

Preferably the timber or timber substitute is impregnated with a fire-retardant composition (e.g. ammonium sulphate) before the moulding operation. This ensures that there is no distortion of the finished shape of the panel after moulding due to the fire-retardant treatment.

Further objects and advantages of the invention will become apparent from the following description of five embodiments of the invention, given by way of example.

DETAILED DESCRIPTION OF THE EMBODIMENTS OF THE INVENTION

Figure 1:
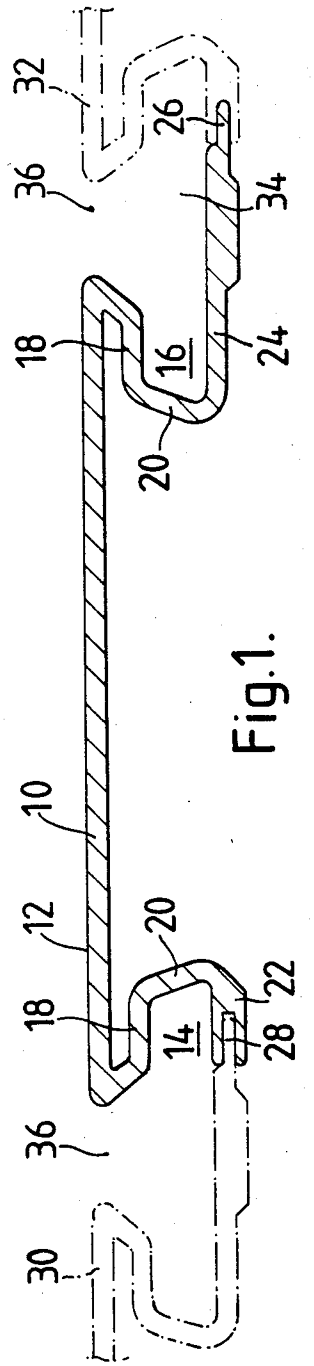
FIG. 1 is a cross-section through a first panel member, showing its connection to two adjacent panel members.

In FIG. 1, there is shown a display panel member, suitable for use in the construction of a slatted panel display system, which is manufactured by extruding in aluminium or aluminium alloy. Consequently, the panel member is formed as a monolithic structure, and by virtue of the extrusion manufacturing technique, it is of constant cross-section throughout its length. That cross-section is clearly shown in FIG. 1.

The panel member has a fronting centre portion 10, which is generally planar, and the front surface 12 of this centre portion is intended to provide the exposed surface of the panel in the finished system. Consequently, this front surface is made as smooth as practicable, and indeed may actually be polished in order to give a mirror effect. The overall width of the centre portion determines the width of the panel members as they will appear in the finished system, and whilst clearly, the width can vary, it will be mentioned by way of illustration, that the width of the centre portion in a typical panel member may be in the order of 100 millimeters.

Along each longitudinal edge of the panel member there is a channel 14, 16, formed by a return flange 18, a web 20, and a rear flange 22 and 24. As illustrated in FIG. 1, the two channels 14 and 16 are offset inwardly of the longitudinal edges of the centre portion 10, and the web 20 is inclined inwardly and rearwardly. The rear flange 22 shown at the lefthand end of FIG. 1 terminates inwardly of the return flange 18 at that end, whereas the rear flange 24 at the righthand end of FIG. 1 projects well beyond the return flange 18, and also beyond the longitudinal extremity of the centre portion 10 at that end.

A tongue 26 projects from the end of the rear flange 24, and a mating groove 28 is formed in the rear flange 22. Hence, it is possible to assemble a series of panel members such as that illustrated in full lines in FIG. 1, by forming tongue-and-groove joints between adjacent panel members. FIG. 1 shows in dotted lines, adjacent panel members 30 and 32 one on each side of the panel shown in full lines. The tongue 26 is made so that it is a sliding fit in the groove 28 of an adjacent identical panel member, and the tongue-and-groove joint is best formed by sliding one panel member longitudinally, with its tongue engaging progressively along the length of the groove of the adjacent panel member.

It will be observed, that when two adjacent panel members are connected together, a longitudinally extending undercut recess or groove 34 is formed between the two panel members, and there is a longitudinally extending opening 36 between the adjacent edges of the centre portion 10, into the undercut recess. This arrangement produces the essential "slatted panel" construction and appearance of the finished system, and enables the fitting of attachments (not shown) for the support of items to be displayed on the slatted panels. The open undercut recess is achieved by the fact that the mating rear flanges 22 and 24 of adjacent panel members are, in the mating position, wider than the part of the two centre portions 10 immediately in front of them.

When a slatted panel system is to be constructed, the required number of panel members formed as shown in FIG. 1 is cut to the lengths determined by the requirements of the system, and those panel members which have to be secured to any supporting structure of the system are machined to accept the fixing and/or locating elements. For instance, it might be necessary to drill holes through the rear flanges 24 to accept fixing bolts or screws. The panel members are then assembled using the tongue-and-groove joints, and secured to the supporting structure. The securing of some of the panel members will ensure that all the panel members are retained on the supporting structure. Incidentally, since the extruded section produces a quite rigid panel member, there may be circumstances, in which no supporting structure is required, and the slatted panel system constructed merely by assembling a series of panel members as shown in FIG. 1 is sufficiently self-supporting to be used by itself. This may well be the case, for example with display units for use in exhibitions. Since the extruded panel member is supplied in relatively long lengths which are intended to be cut to a required length for a particular system, an interesting feature of the invention is that it is possible to arrange for the abutting end joints in a system to be offset from those in adjacent panel members, so that the overall appearance of the system is more interesting than a system in which all the panel members are of the same length, and consequently, there are transverse joints extending across the full width of the system. In the case where the panel members are fitted to a wall in a horizontal disposition, such transverse joints will be vertical in the assembled condition.

Besides the simplicity with which the system can be constructed, it is an important feature of this embodiment that the metallic construction of the panel members will meet fire regulations, particularly in shops, without any additional treatment. It has already been mentioned, that the surface 12 of the panel members may be given a surface treatment such as polishing, but equally, the surface 12 could be painted.

Figure 2:
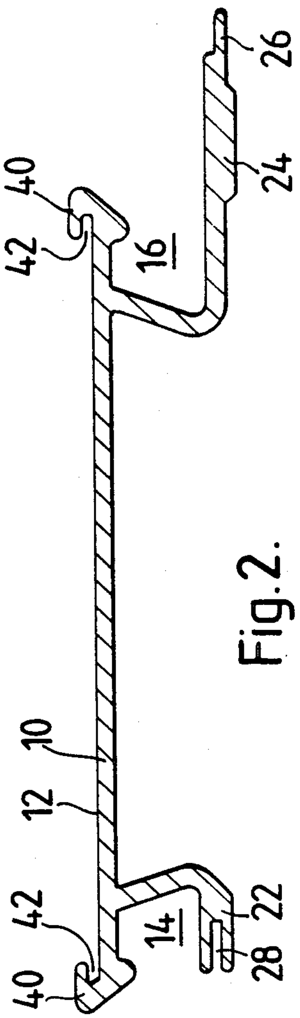
FIG. 2 is a cross-section through an alternative form of panel member.

Turning now to FIG. 2, there is illustrated an alternative panel section, which in many respects is similar to the panel member illustrated in FIG. 1, and therefore the same reference numerals have been used for identical parts. The essential difference between the panel member shown in FIG. 2 and that shown in FIG. 1, is that along each longitudinal edge of the centre portion 10, there is an upstanding rib 40, with a groove 42 formed in it, the rear side of this groove being formed by part of the surface 12 of the centre portion. With this construction, it is possible to slide a coloured, or otherwise distinctive sheet (not shown) into the grooves 42, whereby the sheet provides a surface effect for the flats of the finished panel system.

Another optional feature illustrated in FIG. 2 is that the return flange 18 is omitted, and instead, the front side of the channel 14 or 16 is formed by part of the planar centre portion 10.

Figure 3:
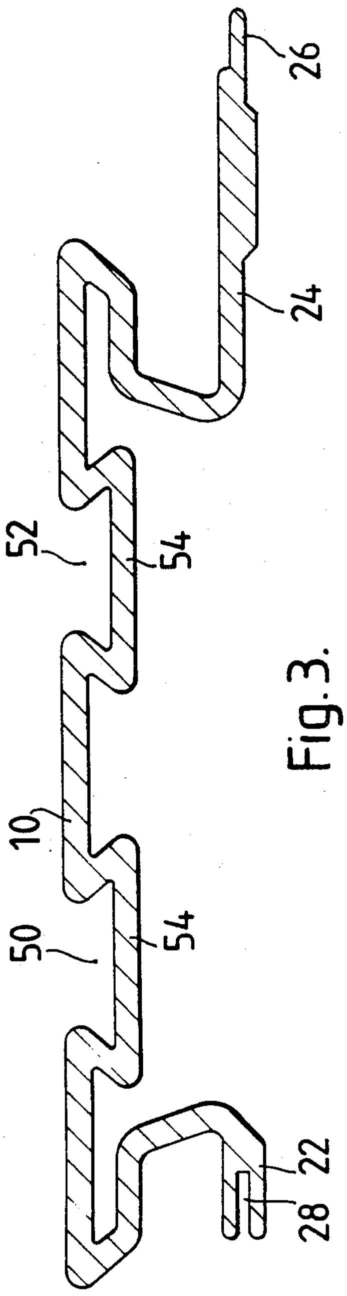
FIG. 3 is a cross-section through another form of panel member.

FIG. 3 illustrates a rather more complex panel member in which the longitudinal edges are identical with those shown in FIG. 1, but the centre portion 10 is formed with two longitudinally extending dovetail cross-sectioned grooves 50 and 52. In order to maintain an equal thickness of the extrusion, there are corresponding dovetail-shaped protrusions 54 on the rear of the centre portion 10.

The panel member illustrated in FIG. 3 when assembled into a panel system exhibits two additional longitudinally extending undercut recesses or grooves 50 and 52, besides the grooves formed between adjacent panel members, These longitudinally extending grooves 50 and 52 can be used purely for appearance, but it will be appreciated, that they could also be used for the attachment of devices intended to support articles to be displayed. It will be appreciated that other groove arrangements are possible. For instance the grooves 50 and 52 may be much deeper to act as ordinary attachment grooves. Also, the rear flanges 22 and 24 may be extended to form a complete rear wall from upstanding webs carrying a continuous or divided front wall.

Figure 4:
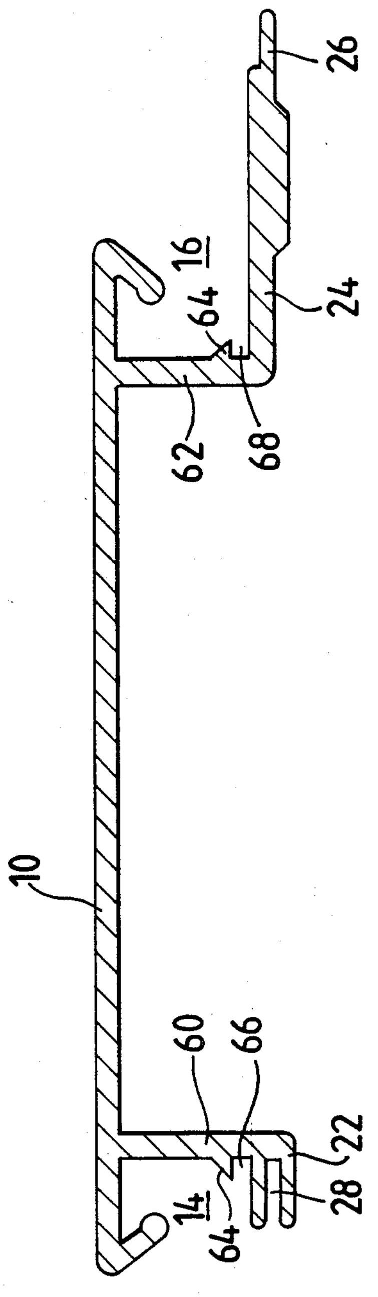
FIG. 4 is a cross-section through a further panel member.

FIG. 4 illustrates another panel member which in many ways resembles the panel shown in FIG. 1, and therefore the same reference numerals have been used for identical parts. However, in this construction the channels 14 and 16 are formed by webs 60 and 62 perpendicular to the centre portion 10 and extending from the centre portion to the rear flanges 22 and 24. FIG. 4 also shows the provision of nebs 64 on the webs 60 and 62 to form recesses 66 and 68. The edges of a coloured or otherwise distinctive sheet can be received in the recesses 66 and 68 to enhance the appearance of the panel members. It will further be appreciated, that a panel system may be constructed using different panel members as illustrated in FIGS. 1, 2, 3 and 4, since it will be noted, that the tongue-and-groove arrangement is the same in each case.

Figure 5:
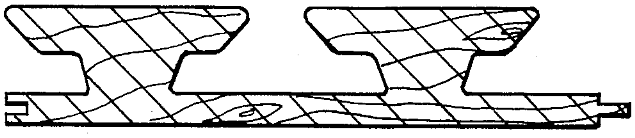
FIGS. 5 and 6 are cross-sections through two further embodiments of panel member.
Figure 6:
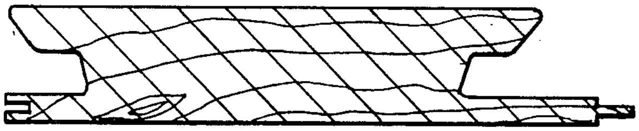

Turning now to FIGS. 5 and 6, there are shown two forms of panel member constructed from timber or timber substitute.

Apart from the fact that the panel members are of timber or timber substitute, they otherwise have similar features to the extruded metal display panel members shown in FIGS. 1 and 4 and can be used in a similar manner. In particular, the panel members of FIGS. 5 and 6 are assembled, forming tongue-and-groove joints, and leaving open grooves or recesses between adjacent panels, as described above.

It will be appreciated that the timber can be treated to produce various surface effects, such as polishing, varnishing or coating, and in addition, coloured plastics sheets can be inserted in the grooves formed in the display panel members and/or in the grooves formed between adjacent display panel members, in order to provide coloured effects visible through the open grooves in the completed display.

I claim:

1. A display panel comprising a panel member having two opposite longitudinal edges and in cross-section a pair of shoulders each in part defining an undercut recess extending throughout the length of the panel member along each respective longitudinal edge, said panel having first and second rear flanges separated from the shoulders by the respective undercut recesses, a male tongue along the edge of the first rear flange and a mating female groove along the edge of the second rear flange, said female groove separate and spaced from the respective undercut recess, the combined width of the first and second rear flanges being greater than the combined widths of the pair of shoulders, so that when said panel member is mated with a similar panel member the respective male tongue and female groove form a tongue-and-groove joint and the two respective panel shoulders nearest the joint define an opening into an undercut channel having the undercut recesses located on each side thereof proximate the said joint and remaining open.

2. Display panel as claimed in claim 1, wherein said panel member is of extruded aluminum material.

3. Display panel as claimed in claim 1, wherein the panel member comprises a generally planar front and center portion, with a return portion at each end forming the undercut recess along the longitudinal edge of the center portion, with the male tongue and female groove respectively being on a rear part of the undercut recess which rear part is generally parallel with said center portion.

4. A display panel as claimed in claim 3, wherein said two rear parts are arranged relatively to the center portion such that when two panel members are joined together, there is a longitudinally extending gap between the two adjacent center portions, and the two undercut recesses open from the rear side of such gap to provide a composite undercut recess.

5. A display panel comprising a panel member having two opposite longitudinal edges and in cross-section an undercut recess extending throughout its length along both of its longitudinal edges, said panel having a male tongue along one longitudinal edge and a mating female groove along the other longitudinal edge to form a tongue-and-groove joint when mated with a similar panel member, said panel member having a front face which, when fitted together with similar panel members, forms a display surface separated by undercut grooves, said panel member also having first and second rear flanges separated from the front face by the undercut recesses, the first rear flange having the male tongue on its free edge and the second rear flange having the female groove on its free edge, one of said free edges underlying the undercut portion of the respective recess so that when a joint is formed with an adjacent panel the resulting joint is at least partly hidden from sight by the undercut portion of the recess.

6. A display panel comprising a plurality of panel members with joints therebetween, the dispaly panel having a generally planar front face and a plurality of parallel grooves, each groove having a generally planar bottom located below said front face, first and second side walls and an open mouth, first and second shoulders extending towards one another away from the respective first and second side walls to close the mouth partially, each of said joints being formed at the bottom of one of the grooves and extending longitudinally thereof, the said joint being at least partially concealed from front face view by one of said shoulders of said one groove.

7. Panel of claim 6, wherein said joint is a tongue-and-groove joint.

8. Panel of claim 7, wherein said first and second side walls terminate in first and second rear flanges separated from the front face by said groove and having a male tongue and a female groove respectively being formed at the free edge thereof.

9. Panel of claim 6, wherein the grooves having joints formed at the bottom thereof are separated by intermediate grooves lacking said joints, with all of said grooves having the same general cross-sectional undercut configuration.

10. A display array of at least two similar generally planar panel members joined by a tongue-and-groove joint, each panel member having two opposite longitudinal edges and in cross-section undercut recesses extending throughout its length along both of its longitudinal edges, each said panel member having a male tongue along one longitudinal edge and a mating female groove along the other longitudinal edge, said joint being formed by mating a tongue of one panel member and a groove of another panel member, shoulders proximate each undercut recess and generally extending thoughout the length of each panel member, said array including an opening defined by said shoulders of the respective panel members and opening to an undercut channel having a width greater than said opening and generally defined by said undercut recesses and said tongue-and-groove joint, said undercut channel having an axis passing through said opening and generally perpendicular to the plane of the panel member, said shoulders and said tongue-and-groove joint spaced from said axis, said axis passing through only one of the panel members defining said undercut groove.

11. Array of claim 10, wherein said undercut recesses forming an undercut channel are generally symmetrical about the axis.

* * * * *